(12) United States Patent
Flytzani-Stephanopoulos et al.

(10) Patent No.: US 8,628,744 B2
(45) Date of Patent: Jan. 14, 2014

(54) SULFUR-TOLERANT WATER-GAS SHIFT CATALYSTS

(75) Inventors: Maria Flytzani-Stephanopoulos, Winchester, MA (US); Ioannis Valsamakis, Andover, MA (US)

(73) Assignee: Tufts University, Medford, MA (US)

( * ) Notice: Subject to any disclaimer, the term of this patent is extended or adjusted under 35 U.S.C. 154(b) by 0 days.

(21) Appl. No.: 13/504,702

(22) PCT Filed: Nov. 9, 2010

(86) PCT No.: PCT/US2010/005916
§ 371 (c)(1),
(2), (4) Date: Jul. 19, 2012

(87) PCT Pub. No.: WO2011/057230
PCT Pub. Date: May 12, 2011

(65) Prior Publication Data
US 2012/0275979 A1    Nov. 1, 2012

Related U.S. Application Data

(60) Provisional application No. 61/259,274, filed on Nov. 9, 2009.

(51) Int. Cl.
| | |
|---|---|
| *B01D 53/00* | (2006.01) |
| *B01J 27/02* | (2006.01) |
| *B01J 27/053* | (2006.01) |
| *B01J 27/055* | (2006.01) |
| *C01B 3/16* | (2006.01) |
| *C01B 3/18* | (2006.01) |
| *C01B 31/18* | (2006.01) |
| *C01B 31/20* | (2006.01) |

(52) U.S. Cl.
USPC ........... 423/230; 423/247; 423/248; 423/655; 502/216; 502/217; 502/218; 502/222

(58) Field of Classification Search
USPC .......... 423/230, 247, 248, 655; 502/216, 217, 502/218, 222
See application file for complete search history.

(56) References Cited

U.S. PATENT DOCUMENTS

| | | | | |
|---|---|---|---|---|
| 4,071,640 A | * | 1/1978 | Ignasiak | 427/215 |
| 5,804,153 A | * | 9/1998 | Fang et al. | 423/242.1 |
| 5,853,684 A | | 12/1998 | Fang et al. | |
| 8,017,545 B2 | * | 9/2011 | Bhattacharyya et al. | 502/216 |
| 2003/0209694 A1 | * | 11/2003 | Holloway et al. | 252/301.4 S |
| 2005/0119119 A1 | | 6/2005 | Rogers et al. | |
| 2009/0118119 A1 | | 5/2009 | Ratnasamy et al. | |
| 2009/0272985 A1 | * | 11/2009 | Ishii et al. | 257/88 |

FOREIGN PATENT DOCUMENTS

| | | | | | |
|---|---|---|---|---|---|
| FR | 2459781 A | * | 2/1981 | | C01B 17/98 |
| JP | 200675716 A | * | 3/2006 | | B01J 27/053 |
| JP | 2010-63949 A | * | 3/2010 | | B01J 20/06 |
| JP | 2010-369412 A | * | 4/2010 | | B01D 53/86 |

* cited by examiner

*Primary Examiner* — Timothy Vanoy
(74) *Attorney, Agent, or Firm* — Cesari and McKenna, LLP

(57) ABSTRACT

A method for oxidizing carbon monoxide by a water-gas shift (WGS) reaction and a method for reducing carbon dioxide by a reverse water-gas shift (RWGS) reaction, both using a catalyst of the formula $xMZLn_2O_2SO_y$, in which M, Ln, x, and y are as defined herein. Also disclosed are novel compositions for use as catalysts for both the WGS and RWGS reactions.

35 Claims, No Drawings

SULFUR-TOLERANT WATER-GAS SHIFT CATALYSTS

CROSS REFRENCE TO RELATED APPLICATION

This application claims the benefit of the priority International Application No. PCT/US2010 /055916, filed Nov. 9, 2010, which claims priority to U.S. Provisional Application Ser. No. 61/259,274, filed Nov. 9, 2009, the contents of both applications are incorporated herein by reference.

BACKGROUND

The water-gas shift (WGS) reaction can be used in conjunction with steam reforming of methane or other hydrocarbons to produce high purity hydrogen. Current methods based on this reaction proceed in two stages: a high-temperature shift on a first catalyst followed by a low temperature shift on a second catalyst. In these methods, fuel gas streams derived from the reformation or gasification of fuels often contain sulfur compounds that are not tolerated by commercial high-temperature water-gas shift catalysts.

The reverse water gas shift (RWGS) reaction is of particular interest for space exploration. For example, this reaction can allow conversion of gases on Mars into water, which, upon electrolysis, gives oxygen for use as fuel.

There is a need for sulfur-tolerant high-temperature catalysts for both the WGS reaction and the RWGS reaction.

SUMMARY

The present invention is based on an unexpected discovery that certain lanthanide oxysulfides and lanthanide oxysulfates can be used as sulfur-tolerant high-temperature catalysts for both the WGS reaction and the RWGS reaction.

In one aspect, this invention relates to a method of reducing carbon dioxide with hydrogen to produce carbon monoxide and water by a RWGS reaction. To practice the method, a catalyst of the following formula is first placed in a reactor:

$$xM/Ln_2O_2SO_y \qquad (I).$$

In formula (I), M, a dopant, is a transition metal, a transition metal oxide, a Group VIII metal, a Group VIII metal oxide, a Group I metal, or a Group I metal oxide, or a combination thereof (e.g., two to five thereof); Ln (a lanthanide or a combination of lanthanides) is La, Pr, Nd, Pm, Sm, Eu, Gd, Tb, Dy, Ho, Er, Tm, or Yb, or a combination of two to four thereof; x is 0-30 wt % based on the total weight of the catalyst; and y is 0 or 4.

A gaseous stream containing carbon dioxide and hydrogen is then fed into the reactor to produce carbon monoxide and water at 100-800° C., e.g., 300-800° C.

The gaseous stream can contain one or more sulfur compounds (e.g., $H_2S$, COS, or any other sulfur compound found in a gas stream exiting a fuel reformer) in amounts of up to 3000 parts per million (ppm) by volume.

In short, the catalyst of formula (I) can be used to promote the reaction between carbon dioxide and hydrogen to produce carbon monoxide and water in a gaseous stream containing sulfur compounds.

In one embodiment, the catalyst of formula (I) is free of any additive (i.e., x is 0). Examples of such a catalyst include, but are not limited to, $Pr_2O_2SO_4$ (i.e., Ln is Pr and y is 4), $La_2O_2S$ (i.e., Ln is La and y is 0), and $(La_{0.7}Pr_{0.3})_2O_2S$ (i.e., Ln is a combination of La and Pr, and y is 0). Alternatively, the catalyst of formula (I) can contain an additive (i.e., x is not 0) in an amount of up to 1 wt %, up to 5 wt %, or even up to 30 wt % based on the total weight of the catalyst. Examples of such a catalyst include, but are not limited to, $xAu/Pr_2O_2SO_4$ (i.e., M is Au, a transition element, Ln is Pr, x is, e.g., ≤5 wt %, and y is 4). The reaction conditions, including temperature, for the above-described method vary, depending on the composition of the catalyst (e.g., presence or absence of an additive). Examples include, a temperature of 300-800° C. for $Pr_2O_2SO_4$ (i.e., praseodymium oxysulfate, a catalyst free of additive), 500-800° C. for $La_2O_2S$ (i.e., lanthanum oxysulfide, a catalyst free of additive), and 100-500° C. for $xAu/Pr_2O_2SO_4$ (i.e., gold supported on praseodymium oxysulfate, x is, e.g., ≤5 wt %). The temperature may further depend on the sulfur compound content of the gaseous stream. For instance, the temperature can be 600-800° C. in processing a gaseous stream containing up to 120 ppm $H_2S$ by volume when $Pr_2O_2SO_4$ is used as the catalyst. All the reaction conditions can be empirically determined.

In another aspect, this invention relates to a method of oxidizing carbon monoxide with water to produce carbon dioxide and hydrogen by a WGS reaction.

In this method, a gaseous stream containing carbon monoxide and water is fed into a reactor in which the above-described catalyst is placed to produce carbon dioxide and hydrogen at 100-800° C. The gaseous stream can contain, up to 3000 ppm by volume, one or more sulfur compounds.

Factors that affect the reaction conditions (e.g., temperature), which again can be determined empirically, include the composition of the catalyst used, whether the catalyst includes an additive or not, and the sulfur compound content of the gaseous stream. Examples include, a temperature of 300-800° C. for $Pr_2O_2SO_4$ (i.e., praseodymium oxysulfate, a catalyst free of additive), 500-800° C. for $La_2O_2S$ (i.e., lanthanum oxysulfide, a catalyst free of additive), and 100-500° C. for $xAu/Pr_2O_2SO_4$ (i.e., gold supported on praseodymium oxysulfate, x is, e.g., ≤5 wt %). The temperature may further depend on the sulfur compound content of the gaseous stream. For instance, the temperature can be 600-800° C. in processing a gaseous stream containing up to 120 ppm $H_2S$ by volume when $Pr_2O_2SO_4$ is used as the catalyst.

In still another aspect, this invention relates to a composition of the following formula:

$$M/Ln_2O_2SO_z \qquad (II).$$

In formula (II), M is an additive that can be a transition metal, a transition metal oxide, a Group VIII metal, a Group VIII metal oxide, a Group I metal, or a Group I metal oxide, or a combination thereof (e.g., two to five metals); Ln is La, Pr, Nd, Pm, Sm, Eu, Gd, Tb, Dy, Ho, Er, Tm, or Yb, or a combination thereof (e.g., two to four lanthanides); and z is 0 or 4. The weight percentage of the additive in the composition can be up to 30 wt % based on the total weight of the composition.

The details of one or more embodiments of the invention are set forth in the description below. Other features, objects, and advantages of the invention will be apparent from the description and from the claims.

DETAILED DESCRIPTION

We discovered that certain lanthanide oxysulfates and certain lanthanide oxysulfides catalyze both the WGS reaction ($CO_{(g)}+H_2O_{(g)} \rightarrow H_{2(g)}+CO_{2(g)}$) and the RWGS reaction ($H_{2(g)}+CO_{2(g)} \rightarrow CO_{(g)}+H_2O_{(g)}$) over a wide temperature range. We also discovered that catalysts, covered by formula (I) above, are sulfur-tolerant and can be used at temperatures as high as 800° C. These catalysts, which can include an additive such as a transition metal, a Group VIII metal, a Group I metal, or an oxide of any of these metals, or a combination thereof, are oxysulfides or oxysulfates of Pr, Nd, Pm, Sm, Eu, Gd, Tb, Dy, Ho, Er, Tm, or Yb, or of a combination of two or more thereof.

Accordingly, within the scope of the present invention are two methods using these catalysts, one for the WGS reaction and one for the RWGS reaction.

To prepare the catalysts, one can use standard methods known in the art. For example, both lanthanide oxysulfides and lanthanide oxysulfates are prepared from a lanthanide oxide, which can be obtained by hydrolysis of the corresponding lanthanide nitrate precursor. Reacting the lanthanide oxide with $H_2S$ leads to the lanthanide oxysulfide, which can then be oxidized to the oxysulfate by an oxygen temperature-programmed oxidation ($O_2$-TPO).

Lanthanide oxysulfides in which Ln is two or more lanthanides, e.g., Ln is two lanthanides such as La and Pr, can be prepared by a similar method from a corresponding oxide synthesized by the urea coprecipitation/gelation method. Note that the sum of the numbers of atoms of the two or more lanthanides is not necessarily 1, as the lanthanides may form a mixture.

Lanthanide oxysulfates can also be obtained by a surfactant assisted method, as described in Machida et al., *Journal of Materials Chemistry*, 2006, 16, 30, 3084-3090.

Preparation of catalysts containing an additive M, e.g., Au, can be achieved by a method in which the additive is deposited on a lanthanide oxysulfate or a lanthanide oxysulfide, e.g., by deposition/precipitation from a solution, by impregnation, by ion exchange, or by vapor phase deposition.

Examples 1-4 below provide details of preparing certain catalysts for use in this invention.

The catalysts can be tested for their redox properties and their stability in a gaseous stream free of sulfur compounds by a hydrogen temperature-programmed reduction ($H_2$-TPR) for oxysulfates and by $O_2$-TPO for oxysulfides. See e.g., Example 7 below.

The catalysts can be obtained in different forms, e.g., pellets and granules. Also, they can either be supported or unsupported in a reactor. For instance, a catalyst can be supported on a high-temperature ceramic support containing either oxides of alumina, silica, zirconia, titania, molybdena, ceria, yttria, scandia, or mixed oxides thereof, or containing non-oxide compounds, e.g., carbides and nitrides. Further, the catalysts can also be prepared, by methods well known in the art, as coatings on monolith channel walls, e.g., honeycomb ceramic walls, plates, foams, and other configurations, as described in catalyst preparation articles, textbooks, and handbooks, e.g., Fundamentals Of Industrial Catalytic Processes (2005) by C. H. Bartholomew and Robert J. Farrauto.

To practice both methods of this invention, a catalyst is first loaded, in a reactor (e.g., a packed bed reactor). A gaseous stream containing the reactants can then be fed into the reactor at a given flow rate and with a given contact time (e.g., 0.26 g s/mL), and heated to a temperature between 100° C. and 800° C.

The conversion of carbon monoxide into carbon dioxide by a WGS reaction or the conversion of carbon dioxide into carbon monoxide by a RWGS reaction can be determined by measuring the changes in concentrations of the carbon monoxide and carbon dioxide, using conventional methods, e.g., gas chromatography.

Note that the gaseous stream can contain carbon monoxide, carbon dioxide, water, and hydrogen, among others. Whether a catalyst promotes the WGS reaction or the RWGS reaction depends on the gas composition, temperature, and other reaction conditions.

Also within the scope of this invention is a composition covered by formula (II). Methods for preparing this composition and using it in a WGS reaction or in a RWGS reaction are described above.

Without further elaboration, it is believed that the above description has adequately enabled the present invention. The following examples are, therefore, to be construed as merely illustrative, and not limitative of the remainder of the disclosure in any way whatsoever. All of the publications cited herein are hereby incorporated by reference in their entirety.

EXAMPLES

Example 1

Preparation of Lanthanum Oxysulfide ($La_2O_2S$)

A lanthanide nitrate precursor was precipitated with a highly concentrated NaOH aqueous solution (2.5 M) under stirring at about 100° C. for about 6 hours.

The solution was then cooled to room temperature (RT), separated and washed with deionized (DI) water by centrifugation until the pH was below 8, and finally dried in vacuum at 80° C. overnight. The as-dried powder was crushed, sieved (53 μm), and calcined at 400° C. for 4 h (2° C./min) to afford lanthanum oxide. Sulfidation of the oxide to the oxysulfide was carried out at either 400° C. or 650° C. in 50 mL/min of 0.25% $H_2S$—50% $H_2$—He, until the outlet $H_2S$ concentration was equal to that of the inlet gas. The specific surface areas of the calcined oxide, the oxysulfide obtained at 400° C., and the oxysulfide obtained at 650° C. were determined by the BET method, as described in catalyst characterization articles, textbooks, and handbooks, e.g., Fundamentals Of Industrial Catalytic Processes (2005) by C. H. Bartholomew and Robert J. Farrauto.

The respective values for the surface areas were 76.2 $m^2$/g, 64.2 $m^2$/g, and 46.2 $m^2$/g.

Example 2

Preparation of Praseodymium Ooxysulfate ($Pr_2O_2SO_4$)

Praseodymium oxysulfate was synthesized via a template route as reported by Machida et al., *Journal of Materials Chemistry*, 2006, 16, 30, 3084-3090. A praseodymium nitrate precursor, sulfur dodecyl sulfate (SDS), 28% aqueous $NH_3$, and water (20 mL) were mixed at 40° C. for 1 h to yield a transparent solution that was aged at 60° C. for more than 10 h under constant stirring. The solution was cooled to RT and the precipitate thus obtained was collected by filtration, washed thoroughly with DI water, dried by evacuation at RT, and finally calcined at 500° C. in air.

Example 3

Preparation of Praseodymium-lanthanum Oxysulfide/Oxysulfate (($La_{0.7}Pr_{0.3}$)$_2O_2S$/($La_{0.7}Pr_{0.3}$)$_2O_2SO_4$)

The 30 at. % praseodymium-doped lanthanum oxide precursor was first prepared by the urea coprecipitiation/gelation method. Sulfidation of the mixed oxide to the oxysulfide phase was carried out in 50 mL/min of 0.25% $H_2S$–50%

$H_2$—He, until the outlet $H_2S$ concentration was equal to that of the inlet gas. The oxysulfate was eventually obtained by temperature-programmed oxidation to 950° C. with 20% $O_2$—He.

Example 4

Preparation of Gold Supported on Praseodymium Oxysulfate (xAu/$Pr_2O_2SO_4$)

Praseodymium oxysulfate, prepared in Example 2, was used as a support to deposit gold, following a deposition/precipitation method. Powdered praseodymium oxysulfate was mixed with 500 mL DI water at RT to form a slurry. An amount of $HAuCl_4 \cdot 3 H_2O$ was dissolved in DI water at RT, added dropwise to the slurry under vigorous stirring, and the pH was adjusted to ~8 by addition of 1 M ammonium carbonate. The solution was aged for 1 hour at RT to allow adequate deposition and filtered. The obtained precipitate was washed three times with 1000 mL DI water at 60-70° C. to remove excess chloride, dried, and calcined at 400° C. for 4 h in air.

Example 5

Determination of Activity of Lanthanum Oxysulfide for the RWGS Reaction

The catalytic activity of the two lanthanum oxysulfides prepared in Example 1 for the RWGS reaction was investigated with a gas stream composed of 5% $CO_2$–10% $H_2$—balance He. About 0.1 g of either catalyst was loaded in a packed bed reactor and the gas stream was fed at a flow rate of 70 mL/min and with a contact time of 0.09 g s/mL. The temperature was then increased from RT to 800° C. The conversion of $CO_2$ into CO was determined by gas chromatography every 50° C. from RT to 800° C. As control, the concentrations of $CO_2$ and CO were determined at the outlet of an empty reactor at the same temperatures. Both lanthanum oxysulfides were found to catalyze the RWGS reaction at temperatures higher than 500° C. No by-products, e.g., methane, were detected.

Example 6

Determination of Activity and Stability of Praseodymium Oxysulfate for the WGS Reaction The catalytic activity of praseodymium oxysulfate, prepared in Example 2, for the WGS reaction was investigated in cyclic light-off tests with a gaseous stream composed of 2% CO–10% $H_2O$—balance He at a flow rate of 70 mL/min and a contact time of 0.26 g s/mL. The tests were conducted from RT to 800° C. in ascending temperature mode or light-off mode and in descending temperature mode to determine whether any changes in activity had taken place. The catalyst was loaded in a packed bed reactor and the conversion was determined by measuring the changes of the CO and $CO_2$ concentrations on a gas chromatograph. Testing at each temperature point (i.e., every 100° C. between 200° C. and 800° C.) lasted for 1 h after the steady state was reached.

Activation of the catalyst with time-on-stream was found in these steady-state WGS reaction tests. Conversion of CO started at approximately 300° C. and reached the gas phase equilibrium value at 800° C. No by-products, e.g., methane, were detected in these tests.

Several cycles of heating/cooling were run with the same catalyst to check its stability. After the second cycle, no further activation (or deactivation) was observed. The performance was stable during the variations of temperature.

The stability of the catalyst was further examined in isothermal long-term experiments at steady state with the same gas composition (i.e., 2% CO–10% $H_2O$—balance He, flow rate: 70 mL/min, contact time: 0.26 g s/mL) at 600° C. and 700° C. The conversion of CO was measured over a 10-hour period. Stable CO conversion was found at both 600° C. and 700° C. over a 5-hour period.

No loss of sulfur from this catalyst was noticed with time-on-stream. In other words, it was found to be a stable catalyst, active for both the WGS reaction and the RWGS reaction over a wide temperature range, i.e., ~300-800° C.

Example 7

Evaluation of Redox Properties and Activity of $(La_{0.7}Pr_{0.3})_2O_2S/(La_{0.7}Pr_{0.3})_2O_2SO_4$ The redox properties and activity of the $(La_{0.7}Pr_{0.3})_2O_2S/(La_{0.7}Pr_{0.3})_2O_2SO_4$ system in sulfur-free streams were examined in cyclic $H_2$-TPR/$O_2$-TPO. The temperature was varied from 0 to 950° C.

The gas stream composition was 20% $H_2$—$N_2$ for $H_2$-TPR and 20% $O_2$—He for $O_2$-TPO. The flow rate was 60 mL/min in both cases.

No loss of sulfur was noticed with cycling and the amount of oxygen released/uptaken was similar in each cycle. In other words, $(La_{0.7}Pr_{0.3})_2O_2S$ and $(La_{0.7}Pr_{0.3})_2O_2SO_4$ were found to be stable for use in both the WGS reaction and the RWGS reaction over a wide temperature range, i.e., from ~300° C.-800° C.

Example 8

Evaluation of Stability of Praseodymium Oxysulfate in a Gaseous Stream Containing Hydrogen Sulfide Praseodymium oxysulfate was prepared as described in Example 2. The stability of this catalyst in gaseous streams containing 12 ppm by volume or 120 ppm by volume $H_2S$ was examined at a temperature of 750° C. over a period of about 10 hours.

The catalyst was loaded in a reactor and a gaseous stream containing 11% CO–7% $CO_2$–26% $H_2O$–26% $H_2$-balance He was first fed into the reactor at a flow rate of 207 mL/min and a contact time of 0.04 g s/mL. After about one and a half hour, $H_2S$ was introduced in the feed gas by replacing the balance gas He with an equimolar amount of $H_2S$ and He to obtain 12 ppm by volume $H_2S$ in the gaseous stream. After about three more hours, a bypass was performed for 30 min and then a gaseous stream containing 120 ppm by volume $H_2S$ was introduced. Five hours later, the water supply was cut.

The CO conversion was monitored during the course of these experiments. The flow rate of all the gaseous streams used was 207 mL/min and the contact time was 0.04 g s/mL.

It was found in these experiments that the introduction of 12 ppm by volume and 120 ppm by volume $H_2S$ in the feed gas did not significantly affect the conversion over an extended period of time. The conversion was maintained at approximately 12% for about 2 h for a gaseous stream containing 12 ppm by volume $H_2S$. It was ~10% after 5 h with 120 ppm by volume $H_2S$ in the feed. When the water supply was cut, the catalyst was active for the RWGS reaction even in the presence of 120 ppm by volume $H_2S$.

A considerably lower conversion was measured for the full gas composition, i.e., containing CO, $CO_2$, $H_2O$, and $H_2$, at 750° C., as compared to a product free feed. This result was primarily due to a much lower contact time (0.04 g s/mL as compared to 0.26 g s/mL).

Example 9

Evaluation of Reducibility and Activity for the WGS Reaction of Gold Supported on Praseodymium Oxysulfate ($xAu/Pr_2O_2SO_4$)

To examine whether addition of gold facilitated the redox mechanism, $xAu/Pr_2O_2SO_4$, prepared in Example 4, was characterized by $H_2$-TPR and compared to $Pr_2O_2SO_4$, prepared in Example 2. The $H_2$-TPR profile of $xAu/Pr_2O_2SO_4$ indicates that hydrogen consumption started at around 200° C. and was complete around 800° C. For $Pr_2O_2SO_4$, hydrogen consumption only started at around 500° C. The temperature peak for $xAu/Pr_2O_2SO_4$ was shifted to a lower temperature by almost 100° C. as compared with $Pr_2O_2SO_4$, thereby indicating that gold facilitated the redox mechanism.

Additional proof of a lower temperature for reduction of $xAu/Pr_2O_2SO_4$ was obtained from light off tests using a gaseous stream composed of 2% CO–10% $H_2O$—balance He at a flow rate of 70 mL/min and a contact time of 0.26 g s/mL.

Example 10

Determination of Activity of Lanthanum Oxysulfate for the WGS Reaction

The catalytic activity of lanthanum oxysulfate, prepared with the same technique as in Example 2 (lanthanum nitrate precursor is used instead of praseodymium nitrate precursor), for the WGS reaction was investigated in cyclic light-off tests with a gaseous stream composed of 2% CO–10% $H_2O$—balance He at a flow rate of 70 mL/min and a contact time of 0.26 g s/mL. The tests were conducted from RT to 800° C. in ascending temperature mode followed by descending temperature mode to determine whether any changes in activity had taken place. The catalyst was loaded in a packed bed reactor and the conversion was determined by measuring the changes of the CO and CO2 concentrations on a gas chromatograph. Testing at each temperature point (i.e., every 100° C. between 200° C. and 800° C.) lasted for 1 h after the steady state was reached.

Activation of the catalyst with time-on-stream was found in these steady-state WGS reaction tests. Conversion of CO started at approximately 300° C. and reached the gas phase equilibrium value at 800° C. No by-products, e.g., methane, were detected in these tests. Several cycles of heating/cooling were run with the same catalyst to check its stability. After the second cycle, no further activation (or deactivation) was observed. The performance was stable during the variations of temperature.

Example 11

Determination of Activity of Gold Supported on Praseodymium Oxysulfate for the WGS Reaction The catalytic activity of gold supported on praseodymium oxysulfate, prepared in Example 4, for the WGS reaction was investigated in cyclic light-off tests with a gaseous stream composed of 2% CO–10% $H_2O$—balance He at a flow rate of 70 mL/min and a contact time of 0.26 g s/mL. The tests were conducted from RT to 400° C. in ascending temperature mode followed by descending temperature mode to determine whether any changes in activity had taken place. The catalyst was loaded in a packed bed reactor and the conversion was determined by measuring the changes of the CO and CO2 concentrations on a gas chromatograph. Testing at each temperature point (i.e., every 50° C. between 150° C. and 400° C.) lasted for 1 h after the steady state was reached.

Addition of the gold has resulted in extending the activity of the praseodymium oxysulfate shown in example 9 to temperatures lower than 400° C. as observed in a 2-cylce light off test.

Example 12

Evaluation of Stability of Lanthanum Oxysulfate in a Gaseous Stream Containing Hydrogen Sulfide Lanthanum oxysulfate was prepared as described in Example 2, but using lanthanum nitrate precursor instead of praseodymium precursor. The stability of this catalyst in gaseous streams containing 70 ppm by volume or 700 ppm by volume H2S was examined at a temperature of 800° C. over a period of about 4 hours.

The catalyst was loaded in a reactor and a gaseous stream containing 2% CO–10% $H_2O$-balance He was first fed into the reactor at a flow rate of 70 mL/min and a contact time of 0.26 g s/mL. The tests were conducted from RT to 800° C. in ascending temperature mode. After 2 hours at 800° C., $H_2S$ was introduced in the feed gas by replacing the balance gas He with an equimolar amount of $H_2S$ and He to obtain either 70 ppm by volume $H_2S$ in the gaseous stream or 700 ppm by volume $H_2S$ in the gaseous stream. The catalytic activity was not significantly affected by the presence of the $H_2S$.

No loss of sulfur from this catalyst was noticed with time-on-stream. In other words, it was found to be a stable catalyst, active for both the WGS reaction and the RWGS reaction over a wide temperature range, i.e., ~300-800° C.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. For example, catalyst compositions analogous to the lanthanide oxysulfides and lanthanide oxysulfates described above can also be made, tested, and used to practice this invention. Thus, other embodiments are also within the claims.

What is claimed is:

1. A method of reducing carbon dioxide by a reverse water-gas shift reaction comprising:
placing in a reactor a catalyst of formula (I):

$$xM/Ln_2O_2SO_y \qquad (I),$$

in which
M is a transition metal, a transition metal oxide, a Group VIII metal, a Group VIII metal oxide, a Group I metal, or a Group I metal oxide, or a combination of two to five thereat Ln is La, Pr, Nd, Pm, Sm, Eu, Gd, Tb, Dy, Ho, Er, Tm, Yb, or a combination of two to four thereof;
x is 0-30 wt % based on a total weight of the catalyst;
y is 0 or 4; and
feeding into the reactor a gaseous stream containing carbon dioxide and hydrogen so that the carbon dioxide is reduced with the hydrogen at a temperature of 100-800° C. to produce carbon monoxide and water.

2. The method of claim 1, wherein Ln is La, Pr, Nd, Pm, Sm, Eu, Gd, Tb, Dy, Ho, Er, Tm, or Yb, or a combination of two thereof.

3. The method of claim 2, wherein M is a transition metal, a transition metal oxide, a Group VIII metal, a Group VIII metal oxide, a Group I metal, or a Group I metal oxide.

4. The method of claim 3, wherein the gaseous stream contains a sulfur compound.

5. The method of claim 4, wherein the amount of the sulfur compound is ≤3000 parts per million by volume.

6. The method of claim 5, wherein the sulfur compound is $H_2S$, Ln is Pr, x is 0 wt %, y is 4, and the temperature is 600-800° C.

7. The method of claim 2, wherein x is 0 wt %.

8. The method of claim 7, wherein the temperature is 300-800° C.

9. The method of claim 8, wherein Ln is La, Pr, Nd, Pm, Sm, Eu, Gd, Tb, Dy, Ho, Er, Tm, or Yb.

10. The method of claim 9, wherein Ln is La, y is 0, and the temperature is 500-800° C.

11. The method of claim 8, wherein Ln is $La_{0.7}Pr_{0.3}$ and y is 0.

12. The method of claim 3, wherein x is not 0 wt %.

13. The method of claim 12, wherein the temperature is 100-500° C.

14. The method of claim 13, wherein Ln is La, Pr, Nd, Pm, Sm, Eu, Gd, Tb, Dy, Ho, Er, Tm, or Yb.

15. The method of claim 14, wherein M is Au, Ln is Pr, x is ≤5 wt %, and y is 4.

16. A method of oxidizing carbon monoxide by a water-gas shift reaction comprising:
placing in a reactor a catalyst of formula (I):

$$xM/Ln_2O_2SO_y \qquad (I),$$

in which
M is a transition metal, a transition metal oxide, a Group VIII metal, a Group VIII metal oxide, a Group I metal, or a Group I metal oxide, or a combination of two to five thereof; Ln is La, Pr, Nd, Pm, Sm, Eu, Gd, Tb, Dy, Ho, Er, Tm, or Yb, or a combination of two to four thereof;
x is 0-30 wt % based on a total weight of the catalyst;
y is 0 or 4; and
feeding into the reactor a gaseous stream containing carbon monoxide and water so that the carbon monoxide is oxidized with the water at a temperature of 100-800° C. to produce carbon dioxide and hydrogen.

17. The method of claim 16, wherein Ln is La, Pr, Nd, Pm, Sm, Eu, Gd, Tb, Dy, Ho, Er, Tm, or Yb, or a combination of two thereof.

18. The method of claim 17, wherein M is a transition metal, a transition metal oxide, a Group VIII metal, a Group VIII metal oxide, a Group I metal, or a Group I metal oxide.

19. The method of claim 18, wherein the gaseous stream contains a sulfur compound.

20. The method of claim 19, wherein the amount of the sulfur compound is ≤3000 parts per million by volume.

21. The method of claim 20, wherein the sulfur compound is $H_2S$, Ln is Pr, x is 0 wt %, y is 4, and the temperature is 600-800° C.

22. The method of claim 17, wherein x is 0 wt %.

23. The method of claim 22, wherein the temperature is 300-800° C.

24. The method of claim 23, wherein Ln is La, Pr, Nd, Pm, Sm, Eu, Gd, Tb, Dy, Ho, Er, Tm, or Yb.

25. The method of claim 24, wherein Ln is Pr and y is 4.

26. The method of claim 23, wherein Ln is $La_{0.7}Pr_{0.3}$ and y is 0.

27. The method of claim 18, wherein x is not 0 wt %.

28. The method of claim 27, wherein the temperature is 100-500° C.

29. The method of claim 28, wherein Ln is La, Pr, Nd, Pm, Sm, Eu, Gd, Tb, Dy, Ho, Er, Tm, or Yb.

30. The method of claim 29, wherein M is Au, Ln is Pr, x is ≤5 wt %, and y is 4.

31. A composition of formula (II):

$$M/Ln_2O_2SO_z \qquad (II),$$

in which
M is an additive selected from the group consisting of a transition metal, a transition metal oxide, a Group VIII metal, a Group VIII metal oxide, a Group I metal, a Group I metal oxide, and a combination of two to five thereof
Ln is La, Pr, Nd, Pm, Sm, Eu, Gd, Tb, Dy, Ho, Er, Tm, or Yb, or a combination of two to four thereof; and
z is 0 or 4,
wherein M has a weight percentage of up to 30 wt % based on a total weight of the composition.

32. The composition of claim 31, wherein M is a transition metal, a transition metal oxide, a Group VIII metal, a Group VIII metal oxide, a Group I metal, or a Group I metal oxide.

33. The composition of claim 32, wherein Ln is La, Pr, Nd, Pm, Sm, Eu, Gd, Tb, Dy, Ho, Er, Tm, or Yb, or a combination of two thereof.

34. The composition of claim 33, wherein Ln is La, Pr, Nd, Pm, Sm, Eu, Gd, Tb, Dy, Ho, Er, Tm, or Yb.

35. The composition of claim 34, wherein M is Au, Ln is Pr, z is 4, and M has a weight percentage of ≤5 wt %.

* * * * *